Patented Oct. 4, 1938

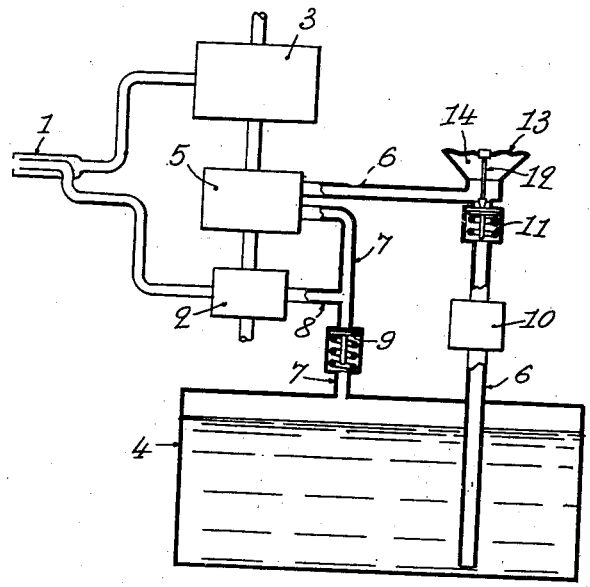
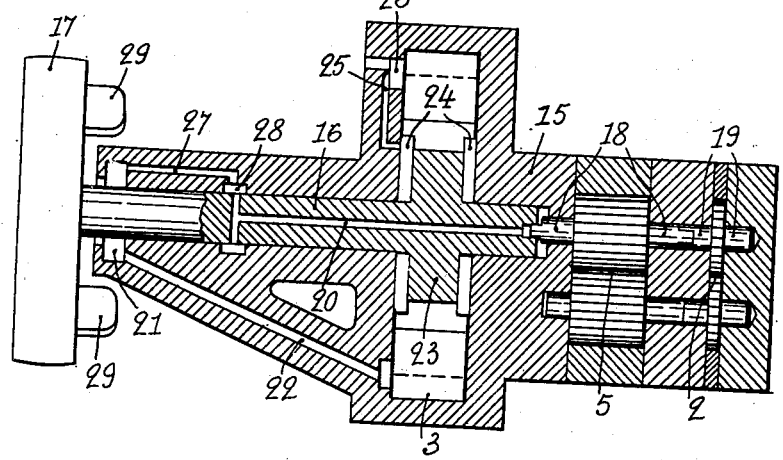

2,132,130

UNITED STATES PATENT OFFICE 2,132,130

PUMP SYSTEM FOR LIQUID FUEL HEATING PLANTS

Louis Edouard Sallot, Paris, France

Application July 21, 1936, Serial No. 91,713
In France August 2, 1935

4 Claims. (Cl. 103—6)

The present invention relates to installations for heating by means of liquid fuel, and more particularly to such heating installations of small capacity.

In such installations of small capacity, it is difficult to ensure that the liquid fuel will be properly sprayed.

The known method of spraying liquid fuel under pressure is not suitable, since it requires the use of sprayers having such small orifices that they are easily obstructed in use, and as it is desirable to utilize in such small capacity plants liquids which are low in cost (fuel-oils) but which are of relatively high viscosity, sprayers having small orifices are particularly objectionable.

Thus, it is necessary to employ the method of spraying by means of air under pressure, termed "air spraying", which does not require heating or the use of liquid fuel at very high pressures, and in which sprayers having orifices of sufficient size, as not to be easily obstructed, may be employed.

However, the viscosity of the fuel oils varies considerably with temperatures, and the burner must be adjusted constantly.

Furthermore, since the liquid fuels are not homogeneous, when they remain in the feeding tanks dense particles are deposited which causes variation in the fluidity of the upper and lower layers and, hence, irregularities in the output of the sprayers.

In the known plants, means are provided to regulate, on the one hand, the output of liquid fuel independently of its viscosity and, on the other hand, the air used for spraying. These means are separate, and for this reason, adjustments are difficult.

The object of the present invention, therefore, is to provide a method of heating by burning liquid fuel, and a plant for carrying out such method, which avoids the disadvantages of the prior art methods, the plant being inexpensive and requiring practically no upkeep.

The method of heating according to the present invention involves (1st) proportioning the amount of energy required for spraying, (the energy being possessed by the spraying air and depending upon the pressure and the output of the spraying air) to the output of liquid fuel; that is, in proportioning the output of air to the output of liquid, the pressure of the air being maintained at a constant value, for practical purposes, by suitable adaptation of the air discharge orifice of the sprayer; and (2nd) causing the calorific delivery of the plant, and hence the output of liquid fuel and of spraying air under pressure, to depend solely upon the operating speed of the means for supplying the sprayer with liquid fuel and with air under pressure. Thus, the calorific output will depend upon only one factor, i. e., the speed of movement of the means ensuring the supply of the sprayer with liquid fuel and with air under pressure. At different operating speeds, the regulation of the spraying air under pressure with respect to the output of liquid fuel is automatic, and it is not necessary to use a regulating means, it being necessary only to adapt the dimensions of the sprayer to the calorific output. In practice, only a few operating rates are used, at well defined speeds, to each of which a given sprayer corresponds.

The heating plant for carrying out the process described herein comprises, in combination, a sprayer, a liquid fuel pump supplying said sprayer, means for supplying said sprayer with air under pressure, the whole output of said means being used by the sprayer which is so adapted for each operating rate that the air pressure remains at the same value for all rates, and means for driving said pump and said supply means at the same speed.

According to a preferred embodiment of my invention, the plant comprises an auxiliary pump (termed a circulation pump) the speed of which is proportional or even equal to that of a fuel pump and of an air-feed device, and the output of which exceeds that of the fuel pump, the auxiliary pump supplying said fuel pump and also discharging into the fuel tank.

With this arrangement, the fuel pump is in the optimum operating condition, and the oil in the tank is stirred and made homogeneous.

Further characteristics of the heating plant and its method of operation will be set forth in the following description, and will be readily understood when read in the light of the accompanying drawing, which is given by way of example, only, and in which Fig. 1 is a diagrammatic view of a small-power plant according to my invention; and Fig. 2 is a diagrammatic view in longitudinal axial section, of the mechanical device including the pumps of this plant.

In the embodiment shown, the plant comprises a sprayer 1 which is supplied with fuel by a feeding pump 2 and with air by an air pump 3. The said sprayer is adjusted to the rate of operation of the air pump, in such a manner that the air pressure remains the same at different operating rates.

The rotors of these two pumps, as well as the rotor of a circulation pump 5 the output of which greatly exceeds that of the pump 2, are keyed to a common driving shaft. The pump 5 withdraws the liquid fuel from a tank 4, through a pipe 6 leading to a point near the bottom of said tank, and delivers the liquid fuel to the upper part of the tank through a pipe 7.

A pipe 8, which is connected with the pipe 7, delivers the liquid fuel to the pump 2 supplying the sprayer 1. A loaded check-valve 9 (or a calibrated orifice followed by a check valve) is mounted in the pipe 7 between the tank 4 and the starting point of the pipe 8, and prevents the free return of the liquid fuel delivered by the circulation pump 5 to the tank 4, and provides for a constant supply of liquid fuel to the pump 2; only the excess fuel delivered by the pump 5 is returned to the tank 4. Owing to the return of the excess fuel to the tank 4, the liquid fuel in the tank is kept homogeneous throughout its whole mass as to density, and at constant temperature.

The feed pump 2 does not operate as a pump, in the usual sense, since the pressure at its inlet is greater than the pressure at its outlet. Its function is to provide a constant supply of liquid fuel to the sprayer in spite of any variations in viscosity or of the pressure of the liquid fuel, and in spite of a possible partial obstruction of the pipe supplying the liquid fuel to the sprayer.

Since the pumps 2 and 3 are driven at the same speed, the output of fuel and of air are in exact proportion, and depend only upon the speed of the common driving shaft.

The characteristics of the feed pump 2 and the air pump 3 are such that the delivery of air under pressure, for a predetermined pressure, and the delivery of liquid fuel, are in such ratio as to ensure proper spraying.

Preferably, a filter 10 and a spring-loaded check valve 11 are mounted in the pipe 6. Said filter serves to ensure a certain degree of purification of the liquid fuel. Said valve is controlled by a rod 12 secured at one end to an elastic diaphragm 13 which forms a space 14 connected with the pipe 6.

In operation, under the action of the vacuum produced by the pump 5, said diaphragm 13 is subject to deformation, and its stem 12 acts upon the valve 11, which is raised from its seating and thus permits delivery of the liquid fuel to the pump 5.

When operation is stopped, after closing of the valves, the diaphragm 13 returns to its initial position, due to its elasticity, and thus produces in the part of the pipe 6 leading to the pump 5 a certain vacuum which is transmitted through pumps 5 and 2, which latter are not perfectly fluid-tight in idle position. This vacuum causes the return to pump 2 of the liquid fuel contained in the sprayer 1 and in the pipe supplying the latter with liquid fuel.

Preferably, the air pump 3 which supplies air under pressure for the spraying, and which is of the blade type, as well as the circulation pump 5 and the feed pump 2, which are geared pumps, are mechanically assembled in a casing 15 (Fig. 2). The shaft of the air pump 3 carries at one end a readily removable driving pulley 17, and drives by the other end of the shaft 18 of the circulation pump 5. The shaft 18 drives at its other end the shaft 19 of the feed pump 2. Thus, the air pump 3 and the pumps 2 and 5 are all driven at the same speed.

Since the shafts 18 and 19, as well as the shafts of the pumps 2 and 5, do not project to the exterior, the leakage of liquid fuel can only take place on the side next to the shaft 16 of the air pump 3. Such leakage of liquid fuel will ensure, on the one hand, directly, the lubrication of the end of the shaft 16 opposite to the shaft 18, and on the other hand, indirectly, the lubrication of the other end of said shaft 16, by means of a channel 20 provided in the shaft 16 and opening, on either side of the latter, at the side of the bearing adjacent the pulley 17.

The liquid fuel leaking from the end of this bearing is collected in an internal groove 21 formed in the said bearing, and it is drawn into the interior of the air pump 3 by the air which is withdrawn by this pump 3, the suction of the air from the exterior being effected through a channel 22 provided for this purpose in the casing 15. The leaking fuel thus brought to the interior of the pump 3 ensures the lubrication of the blades of the pump and hence their proper working.

As the air pump 3 must operate at speeds which vary considerably, and must not run too rapidly at the maximum speed, it should have a reliable operation at reduced speeds at which the action of the centrifugal force on the blades is very small and is counterbalanced by the action of the air under pressure.

For this purpose, the rotor 23 of the pump 3 has lateral cut-out parts 24 which place the recesses of the different blades in communication with one another, and a channel 25 formed in the casing 15 also ensures the communication between the said cut-out parts 24 and the delivery chamber 26 of the air pump, thus preventing the air pressure exercised upon the blades from counteracting the effect of the centrifugal force which tends to hold them against the inner surface of the casing 15.

A channel 27 provided in the casing 15 connects the upper part of the groove 21 to a groove 28 into which the channel 20 opens. By this arrangement, the air due to leakage under pressure taking place along the axis of the air pump may be discharged freely to the exterior, and in some cases it may even be withdrawn by the vacuum prevailing in the said groove 21, and hence this air cannot enter the fuel pumps and interfere with their operation.

According to the usual construction, the pulley 17 is provided laterally, on the side next the casing 15, with flanges 29 which form a sort of air filter when the pulley is set in rotation, thus preventing the dust from being drawn into the interior of the air pump.

With this plant, the proper spraying of the liquid fuel is always obtained, and the regulation of the calorific output is effected simply by varying the driving speed of the shaft 16, for instance by replacing the pulley 17 by a pulley of a different diameter and by using a sprayer whose dimensions correspond to the calorific output. Thus the user has no regulating device at hand. No faulty adjustment can occur, since at all operating speeds the output of spraying air and of liquid fuel are always in a ratio which assures an approved spraying.

The present invention, which offers particular advantages in heating installations of small capacity, may also be employed in heating installations of moderate or large capacity.

Obviously, the invention is not limited to the embodiment herein described and represented, which is given solely by way of example.

Having now described my invention what I claim as new and desire to secure by Letters Patent is:

1. A pump mechanism adapted to supply a liquid fuel sprayer with liquid fuel and air under pressure, comprising in combination a first fuel pump adapted to supply the sprayer with fuel, a second fuel pump adapted to supply the inlet of said first fuel pump with fuel under a constant pressure and to return the excess of fuel to a fuel tank, an air pump adapted to supply said sprayer with air under pressure, the casings of the three pumps forming a single block provided with bearings and both fuel pumps being disposed on the same side of said air pump, driving means, a shaft supported by said bearings adapted to connect said air pump to said driving means and the three pumps to one another, conduit means between the parts of said shaft situated on either side of said air pump and adapted to bring fuel from one side to the other of said air pump, whereby the part of said shaft situated next said driving means is lubricated by the leakage of fuel from said fuel pumps.

2. A pump mechanism according to claim 1, further comprising other conduit means provided in said block and ending on the one hand adjacent said shaft at the end of the bearing of said shaft situated next said driving means and on the other hand at the air inlet of said air pump, whereby said air pump is lubricated by the leakage of fuel from said fuel pumps.

3. A pump mechanism according to claim 1, further comprising other conduit means provided in said block and ending on the one hand adjacent said shaft at the end of the bearing of said shaft situated next said driving means and on the other hand, at the air inlet of said air pump, passages providing communication between said other conduit means on the one hand and the spaces situated about said shaft on either side of said air pump on the other hand, whereby leakage air from said air pump about said shaft is evacuated towards said other conduit means and prevented from entering said fuel pumps.

4. A pump mechanism adapted to supply a liquid fuel sprayer with liquid fuel and air under pressure, comprising in combination a first fuel pump adapted to supply the sprayer with fuel, a second fuel pump adapted to supply the inlet of said first fuel pump with fuel under a constant pressure and to return the excess of fuel to a fuel tank, an air pump adapted to supply said sprayer with air under pressure, the casings of the three pumps forming a single block provided with bearings and both fuel pumps being disposed on the same side of said air pump, a driving pulley provided with vanes on its lateral face which is turned towards said air pump, a shaft supported by said bearings adapted to connect said air pump to said driving pulley and the three pumps to each other, conduit means between the parts of said shaft situated on either side of said air pump and adapted to bring fuel from one side to the other of said air pump, other conduit means provided in said block and ending on the one hand adjacent said shaft at the end of the bearing of said shaft situated next said driving pulley and on the other hand at the air inlet of said air pump whereby the air pump is lubricated by the leakage of fuel of the fuel pumps and the air which is drawn in is filtered through said vanes.

LOUIS EDOUARD SALLOT.